(12) United States Patent
Xu et al.

(10) Patent No.: US 11,622,650 B2
(45) Date of Patent: Apr. 11, 2023

(54) WOK DEVICE FOR FULL-AUTOMATIC COOKING MACHINES AND FULL-AUTOMATIC COOKING MACHINE

(71) Applicant: SHANGHAI AICAN ROBOT (GROUP) CO., LTD., Shanghai (CN)

(72) Inventors: Jinbiao Xu, Shanghai (CN); Guang He, Shanghai (CN); Qing He, Shanghai (CN); Luoya Zeng, Shanghai (CN)

(73) Assignee: SHANGHAI AICAN ROBOT (GROUP) CO., LTD., Shanghai (CN)

( * ) Notice: Subject to any disclaimer, the term of this patent is extended or adjusted under 35 U.S.C. 154(b) by 387 days.

(21) Appl. No.: 16/862,584

(22) Filed: Apr. 30, 2020

(65) Prior Publication Data

US 2020/0297158 A1    Sep. 24, 2020

Related U.S. Application Data

(63) Continuation of application No. PCT/CN2017/117454, filed on Dec. 20, 2017.

(30) Foreign Application Priority Data

Nov. 3, 2017  (CN) .......................... 201711070487.0

(51) Int. Cl.
*A47J 37/10*   (2006.01)
*A47J 36/34*   (2006.01)
(Continued)

(52) U.S. Cl.
CPC .............. *A47J 36/32* (2013.01); *A47J 36/34* (2013.01); *A47J 37/047* (2013.01); *A47J 37/10* (2013.01);
(Continued)

(58) Field of Classification Search
CPC ...... A47J 37/047; A47J 37/101; A47J 37/105; A47J 37/108; A47J 36/34; A47J 44/02
See application file for complete search history.

(56) References Cited

U.S. PATENT DOCUMENTS

2016/0106259 A1*  4/2016  Xu ..................... A47J 37/12
                                                        700/275

FOREIGN PATENT DOCUMENTS

CN          201055262 Y       5/2008
CN          103110339 A  *   5/2013  .............. A47J 27/00
(Continued)

OTHER PUBLICATIONS

International Search Report of PCT Patent Application No. PCT/CN2017/117454 dated Jul. 5, 2018.

*Primary Examiner* — John J Norton

(57) ABSTRACT

A wok device for full-automatic cooking machines comprises a wok (10), a wok heating device (11), a wok rotating device (12), a wok working position controlling device (13) and a wok moving control device (14); the wok heating device (11) is adapted for heating the wok (10); the wok rotating device (12) controls the wok (10) to rotate around a central axis of the wok (10); the wok working position controlling device (13) is adapted for fixing the wok (10) on the wok moving control device (14) and controlling the wok (10) to turn to reach a corresponding working position for corresponding operation; the wok moving control device (14) controls the wok working position controlling device (13) to move directionally in the cooking machine so as to drive the wok (10) to move directionally in the cooking machine. A full-automatic cooking machine comprises the wok device.

10 Claims, 13 Drawing Sheets

(51) Int. Cl.
*A47J 37/04* (2006.01)
*A47J 44/02* (2006.01)
*A47J 36/32* (2006.01)

(52) U.S. Cl.
CPC ........... *A47J 37/101* (2013.01); *A47J 37/105* (2013.01); *A47J 37/108* (2013.01); *A47J 44/02* (2013.01)

(56) References Cited

FOREIGN PATENT DOCUMENTS

| | | |
|---|---|---|
| CN | 103110339 A | 5/2013 |
| CN | 103126515 A | 6/2013 |
| CN | 103126536 A | 6/2013 |
| CN | 206260717 U | 6/2017 |

\* cited by examiner

WOK DEVICE FOR FULL-AUTOMATIC COOKING MACHINES AND FULL-AUTOMATIC COOKING MACHINE

CROSS REFERENCE TO RELATED APPLICATIONS

The present application is a Continuation Application of PCT Application No. PCT/CN2017/117454 filed on Dec. 20, 2017, which claims the benefit of Chinese Patent Application No. 201711070487.0 filed on Nov. 3, 2017. All the above are hereby incorporated by reference.

FIELD OF THE INVENTION

The present invention relates to the technical field of intelligent household electrical appliance, more particularly to a wok device for full-automatic cooking machines and a full-automatic cooking machine.

BACKGROUND OF THE INVENTION

Chinese culinary art is extensive and profound and has a variety of cooking techniques, which mainly comprise: stir frying, stewing, deep frying, boiling, steaming, pan frying, grilling, etc. The essence of various cooking techniques is to cook ever-changing dishes with various tastes and flavors by changing food match and controlling heating. Up to now, cooking process involves a lot of manual labor and relies very much on the cooker's experience and skills.

Some cooking machines with high automation degree also appear at present and may comprise but are not limited to a wok device, a wok lid, a feeding device, a wok washing device and the like, and the wok device can simulate the action of a cook to stir and fry. The wok lid, the feeding device, the wok washing device and other devices are arranged around different working positions of the wok device, and the wok device is matched with a corresponding device to complete a certain operation when the wok device turns to a certain working position. For example, during cooking, the wok lid needs to be matched with the wok to seal and cover the wok; or, during feeding, the outlet of the feeding device needs to be matched with the wok. The existing wok device can only rotate or turn at a fixed position of the cooking machine, so that the wok device is difficult to be automatically matched with other devices. For example, during cooking, the wok is usually closed by the wok lid with manual operation or with a wok lid controlling device only through the gravity of the wok lid, the wok lid cannot tightly close the opening of the wok, the tightness is poor, and therefore the cooking efficiency is not high.

SUMMARY OF THE INVENTION

In order to overcome the defects of the existing wok device, a wok device for full-automatic cooking machines and a full-automatic cooking machine are provided to control the wok to move on the basis of original wok which can be rotated for stir-frying and turned to change the working positions, so that the wok can be matched with other device such as a wok lid, the automation of the automatic cooking machine is further improved, and the working efficiency of the automatic cooking machine is improved.

The embodiment of the invention provides a wok device for full-automatic cooking machines, the wok device comprises a wok, a wok heating device, a wok rotating device, a wok working position controlling device and a wok moving control device;

the wok heating device is adapted for heating the wok; the wok rotating device is connected with the wok and adapted for controlling the wok to rotate around a central axis of the wok;

the wok working position controlling device is adapted for fixing the wok on the wok moving control device and controlling the wok to turn to reach a corresponding working position for corresponding operation;

the wok moving control device is adapted for controlling the wok working position controlling device to move directionally in the cooking machine so as to drive the wok to move directionally in the cooking machine;

the wok heating device, the wok rotating device, the wok working position controlling device and the wok moving control device are connected with a main control device of the cooking machine so as to receive a control command sent by the main control device according to a preset recipe program, and respectively perform heating, rotating, turning and moving operations on the wok according to the control command.

Preferably, the wok device further comprises a protective shell; the wok, the wok heating device and the wok rotating device are arranged in the protective shell; the wok working position controlling device is connected with the protective shell to control the wok in the protective shell to turn, and the wok working position controlling device is driven by the wok moving control device to drive the wok in the protective shell to move.

Preferably, the wok moving control device comprises two sets of moving control assemblies; each set of the moving control assemblies comprises a telescopic rod, a moving connecting piece and a wok moving linear motor fixed in the cooking machine; each moving connecting piece is correspondingly arranged on one of two opposite sides of the protective shell; in each set of the moving control assemblies, one end of the telescopic rod is connected with a driving terminal of the wok moving linear motor, and the other end of the telescopic rod is connected with the moving connecting piece; each telescopic rod is arranged in parallel.

Preferably, each set of the moving control assemblies further comprises a moving guide rail fixed in the cooking machine, and each moving guide rail is parallel to each other; the telescopic rod and the moving connecting piece in each set of the moving control assemblies are disposed on corresponding movable guide rail, so that each wok moving linear motor drives the wok to move directionally in a direction parallel to each movable guide rail.

Preferably, the wok moving control device comprises a main driving screw rod, an auxiliary driving screw rod, a driving motor, a synchronous rotating assembly and two moving connecting pieces; the two moving connecting pieces are adapted for being connected with both sides of the protective shell respectively; the first end of the main driving screw rod is connected with one of the two moving connecting pieces, and the first end of the auxiliary driving screw rod is connected with the other one of the two moving connecting pieces; the second end of the main driving screw rod is connected with the second end of the auxiliary driving screw rod through the synchronous rotating assembly; the driving motor is adapted for driving the main driving screw rod to rotate; the main driving screw rod and the auxiliary driving screw rod are maintained parallel to each other.

Preferably, the synchronous rotating assembly comprises a first synchronous wheel, a second synchronous wheel and a first synchronous belt; the first synchronous wheel is arranged on the main driving screw rod; the second synchronous wheel is arranged on the auxiliary driving screw rod; the first synchronous belt is connected with the first synchronous wheel and the second synchronous wheel, so that the first synchronous wheel drives the second synchronous wheel to rotate when rotating.

Preferably, the synchronous rotating assembly further comprises a third synchronous wheel, a fourth synchronous wheel and a second synchronous belt; a driving terminal of the driving motor is connected with the third synchronous wheel; the fourth synchronous wheel is arranged on the main driving screw rod; the second synchronous belt is connected with the third synchronous wheel and the fourth synchronous wheel, so that the third synchronous wheel drives the fourth synchronous wheel to rotate when rotating.

Preferably, the wok moving control device further comprises two linear sliding rails which are fixed in the cooking machine and are parallel to each other; the two moving connecting pieces are movably arranged on the two linear sliding rails respectively.

Preferably, the wok working position controlling device comprises working position rotating shafts and a working position motor adapted for driving the working position rotating shafts to rotate; the working position rotating shafts are respectively connected to two opposite sides of the protective shell, and one of the working position rotating shafts is connected with the working position motor; the working position motor is mounted on one of the two moving connecting pieces; the other one of the working position rotating shafts is connected with the other one of the two moving connecting pieces.

Preferably, the wok moving control device further comprises a limit switch box arranged above one of the two moving connecting pieces; the limit switch box comprises a first limit switch arranged at an upper limit position of the wok and a second limit switch arranged at a lower limit position of the wok.

Preferably, the wok device further comprises a wok lid fixed in the cooking machine and matched with a wok opening of the wok; the wok moving control device drive the wok to move up or down, so that the wok opening of the wok is closed or opened by the wok lid.

Preferably, when the wok is turned to a cooking working position, the wok opening of the wok faces the wok lid, a central axis of the wok coincides with a central axis of the wok lid, and the moving direction of the wok is parallel to the central axis of the wok lid.

Preferably, when a cooking operation is to be performed, firstly, the wok working position controlling device controls the wok to turn to a cooking working position, so that the wok opening is opposite to the wok lid, then the wok moving control device controls the wok to move, so that the wok opening is closed by the wok lid, and then the wok rotating device controls the wok to rotate so as to perform cooking operation; after the cooking operation is finished, the wok moving control device controls the wok to move reversely, so that the wok opening is separated from the wok lid to open the wok.

The embodiment of the invention provides a full-automatic cooking machine, which comprises a housing and the wok device for full-automatic cooking machines, and the wok device is arranged in the housing.

Preferably, the wok lid fixed in the housing, and the moving direction of the wok controlled by the wok moving control device to move in the housing is parallel to the central axis of the wok lid.

Compared with the prior art, the wok device for full-automatic cooking machines and the full-automatic cooking machine having the wok device provided by the embodiments of the present invention have the beneficial effects that: the wok device for full-automatic cooking machines includes a wok, a wok heating device, a wok rotating device, a wok working position controlling device and a wok moving control device; the wok heating device is adapted for heating the wok; the wok rotating device is connected with the wok and adapted for controlling the wok to rotate around the central axis of the wok; the wok working position controlling device is adapted for fixing the wok on the wok moving control device and controlling the wok to turn so as to enable the wok to reach a corresponding working position for corresponding operation; and the wok moving control device is adapted for controlling the wok working position controlling device to move directionally in the cooking machine so as to drive the wok to move directionally in the cooking machine. By means of the wok moving control device, the wok device can control the wok to move on the basis of original ability to turn for changing working positions, so that the wok can be matched with other device such as a wok lid, the automation of the automatic cooking machine is further improved, and the working efficiency of the automatic cooking machine is improved.

BRIEF DESCRIPTION OF THE DRAWINGS

In order to more clearly illustrate the technical solution of the present invention, the accompanying drawings, which need to be used in the embodiments, are simply described below, and obviously, the drawings in the following description are merely some embodiments of the present invention, and for those of ordinary skill in the art, without the need for inventive effort, will be apparent to those of ordinary skill in the art from the following description. Other drawings may also be acquired from these drawings.

DETAILED DESCRIPTION OF ILLUSTRATED EMBODIMENTS

The technical solutions of the embodiments according to the present invention are clearly and fully described as below with reference to the accompanying drawings in the embodiments of the present invention. Apparently, the embodiments to be described are merely a part rather than all of the embodiments of the present invention. All other embodiments obtained by persons with ordinary skills in the art based on the embodiments of the present invention without creative efforts shall fall within the protection scope of the present invention.

Figure 1:
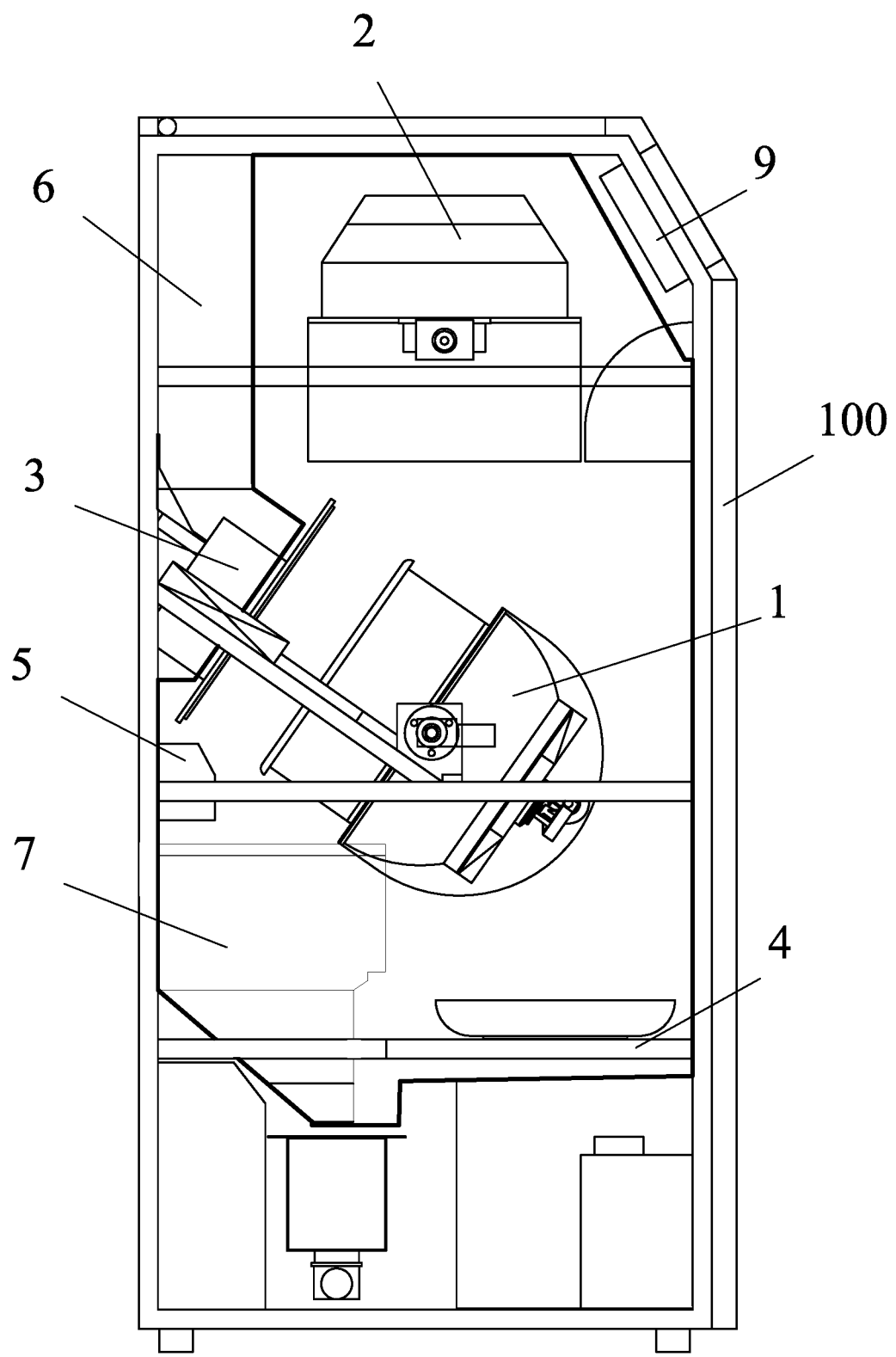
FIG. 1 is a schematic structural view of an automatic cooking machine having a wok device in a first embodiment of the present invention.
Figure 10:
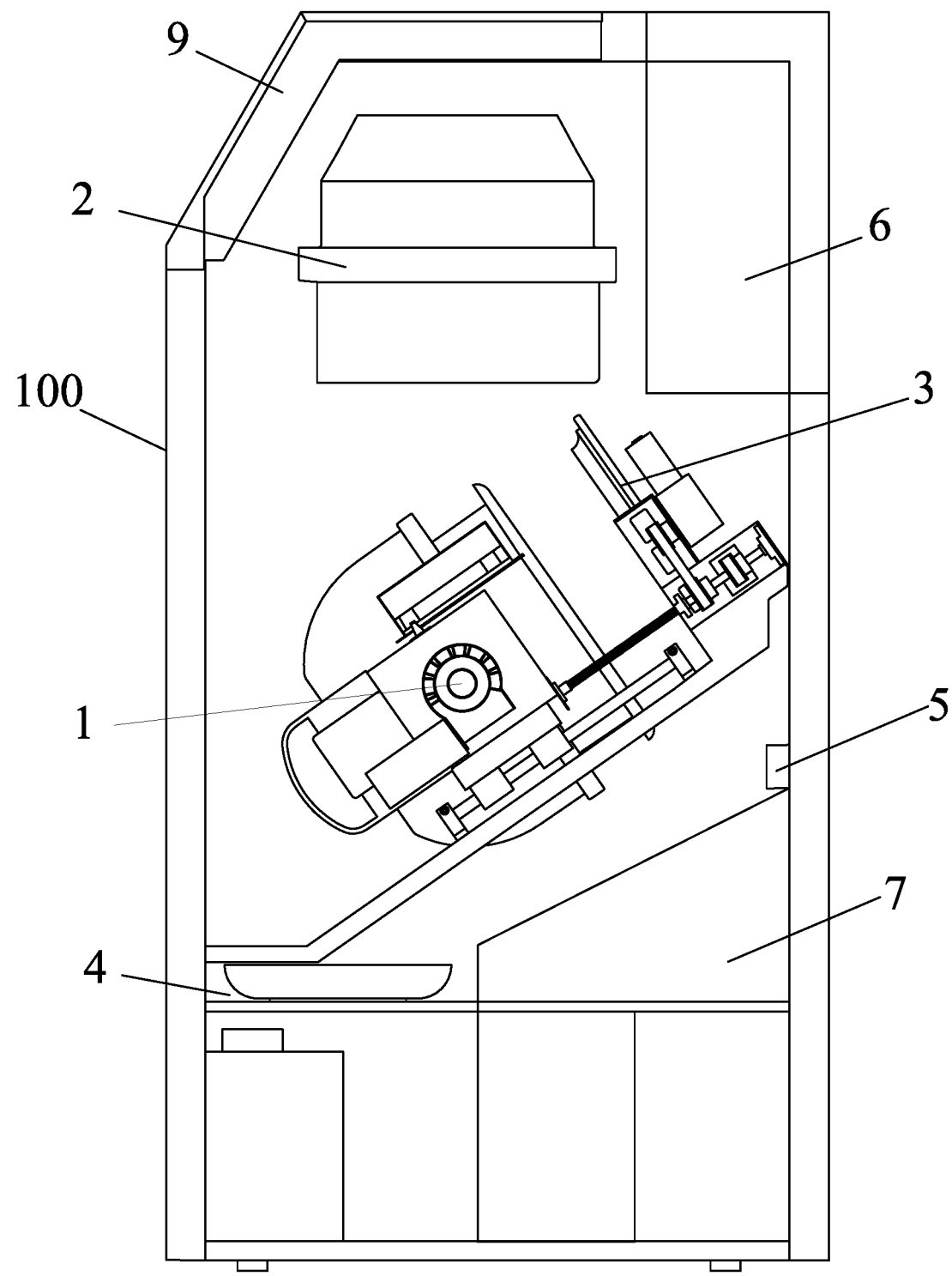
FIG. 10 is a schematic structural view of an automatic cooking machine having a wok device in a second embodiment of the present invention.

Referring first to FIGS. 1 and 10, FIG. 1 is a schematic structural view of an automatic cooking machine having a wok device in a first embodiment of the present invention, and FIG. 10 is a schematic structural view of an automatic cooking machine having a wok device in a second embodiment of the present invention. The full-automatic cooking machine may include, but is not limited to a wok device 1, an automatic ingredient feeding device 2, an automatic seasoning adding device 3, an automatic dish discharging device 4, an automatic wok washing device 5, a cooking fume treatment device 6, a flow guiding device 7 and a main control device 9 which are arranged in a housing 100 of the cooking machine, and the main control device 9 is used for receiving a preset recipe program and sending a corresponding control command according to the recipe program; the wok device 1, the automatic ingredient feeding device 2, the automatic seasoning adding device 3, the automatic dish discharging device 4, the automatic wok washing device 5 and the cooking fume treatment device 6 are connected to the main control device 9, and perform corresponding operation according to a received control command, thereby realizing full-automatic cooking. It should be noted that the structures of the two embodiments are similar in general structure, and both may include but are not limited to the device described above, and thus are not described separately.

The First Embodiment

In the following, with reference to FIG. 2, the structure of a wok device 1 for full-automatic cooking machines in a first embodiment of the present invention is described in detail. The wok device 1 for full-automatic cooking machines includes a wok 10, a wok heating device 11, a wok rotating device 12, a wok working position controlling device 13 and a wok moving control device 14;

the wok heating device 11 is adapted for heating the wok 10;

the wok rotating device 12 is connected with the wok 10 and adapted for controlling the wok 10 to rotate around the central axis of the wok 10;

the wok working position controlling device 13 is adapted for fixing the wok 10 on the wok moving control device 14 and controlling the wok 10 to turn to reach a corresponding working position for corresponding operation;

the wok moving control device 14 is adapted for controlling the wok working position controlling device 13 to move directionally in the cooking machine so as to drive the wok 10 to move directionally in the cooking machine;

the wok heating device 11, the wok rotating device 12, the wok working position controlling device 13 and the wok moving control device 14 are connected with a main control device 9 of the cooking machine so as to receive a control command sent by the main control device 9 according to a preset recipe program, and respectively perform heating, rotating, turning and moving operations on the wok 10 according to the control command.

Figure 2:
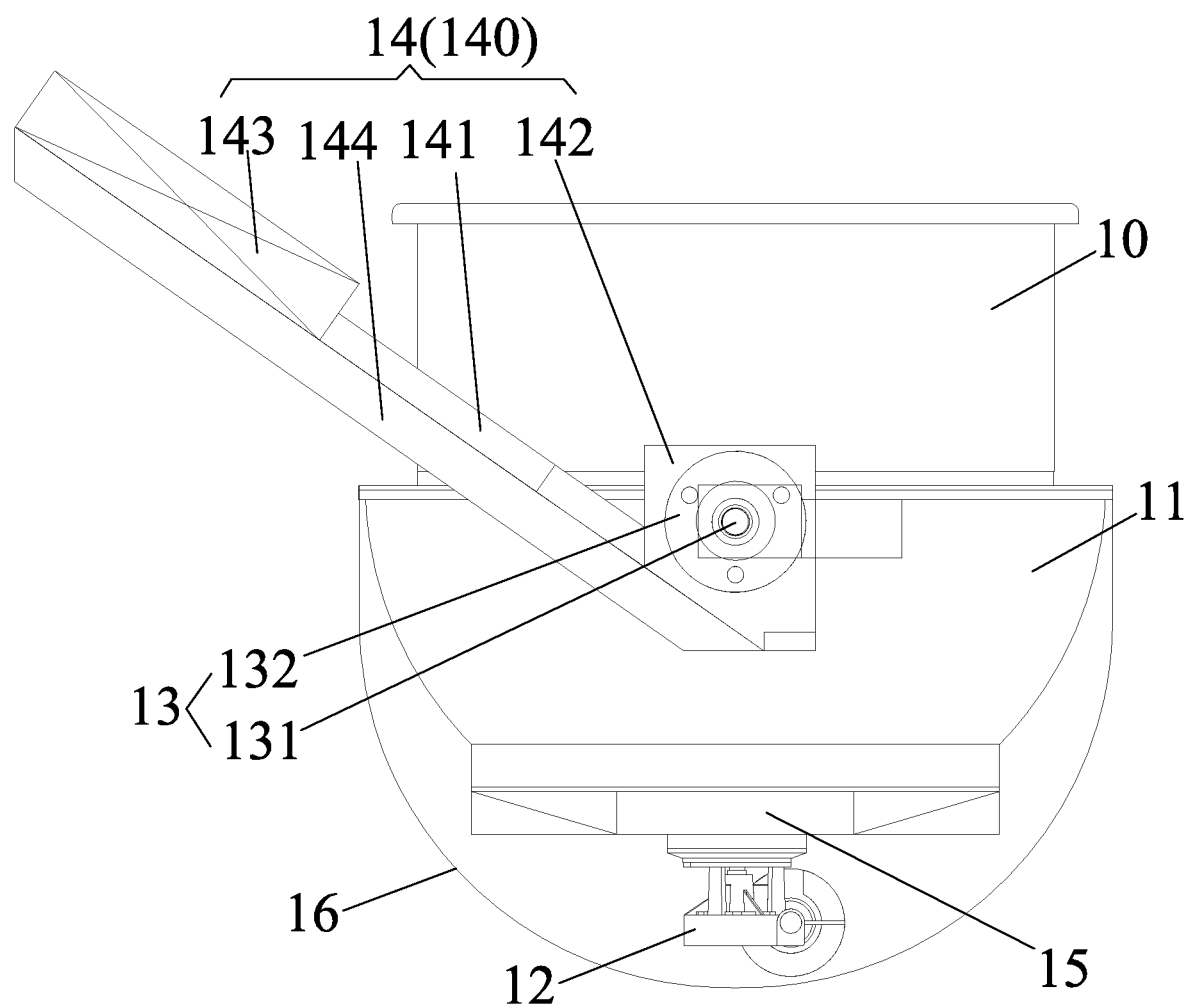
FIG. 2 is a schematic structure view of a wok device 1 for a full-automatic cooking machine in an embodiment of the present invention.
Figure 3:
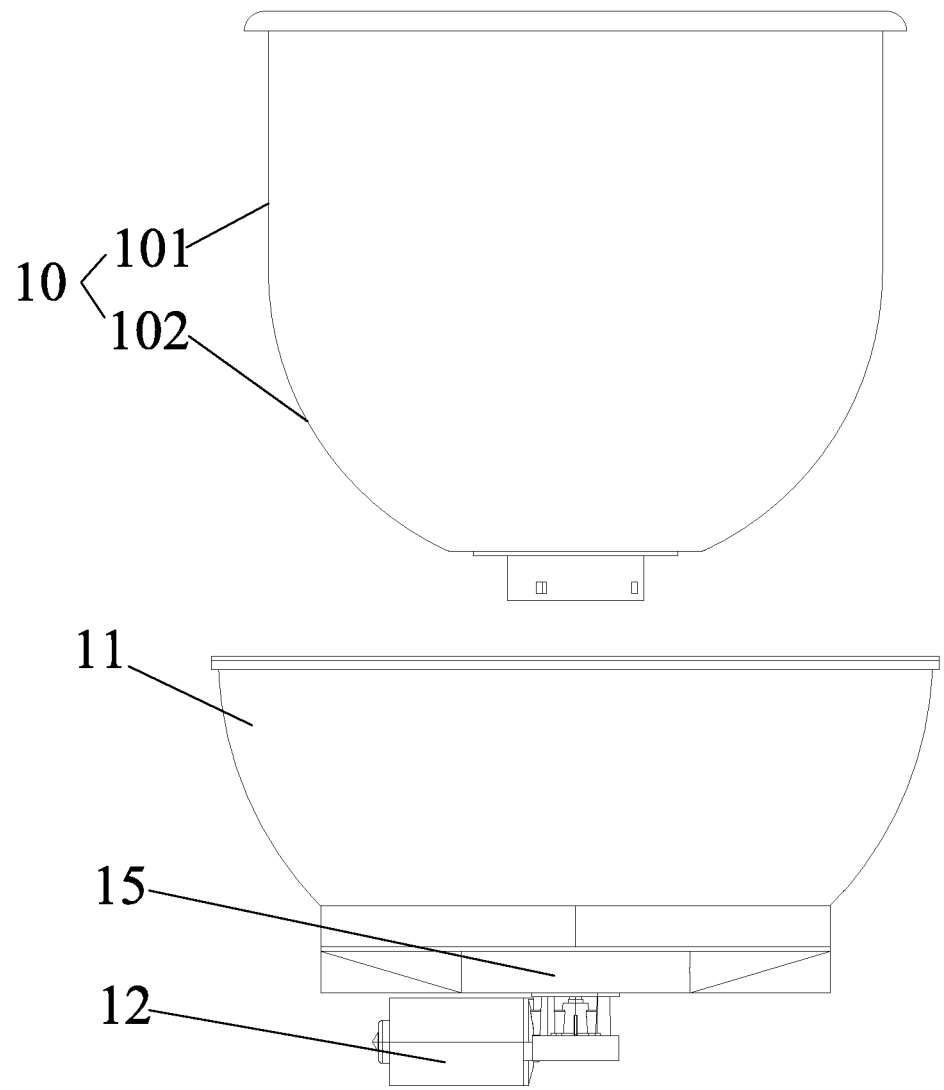
FIG. 3 is a schematic view of a partial structure of the wok device 1 in FIG. 2.

Referring to FIG. 3, which is a schematic view of a partial structure of the wok device 1 in FIG. 2. The cylinder body of the wok 10 includes a hollow cylinder-shaped upper part 101 and a hemisphere-shaped lower part 102. A plurality of stirring pieces used for stir-frying food are arranged on the inner wall of the lower part 102 of the wok 10, so as to achieve stir-frying effects like tossing the wok when the wok 10 is rotated for cooking. The number of the stirring pieces arranged on the inner wall of the lower part 102 of the wok 10 may be 2, 3 or 4. The wok 10 is a stainless iron wok suitable for electromagnetic heating with the entire inner wall of the wok 10 coated with a non-stick material layer having excellent heat resistance, so that the wok 10 has multiple functions of heating food non-stick pan, self-cleaning, easy dish discharging, easier pan washing and low-oil cooking.

The wok heating device 11 includes an electromagnetic heating coil and an electromagnetic heating controlling device; the electromagnetic heating coil winds around the outer wall of the wok 10 and heats the wok 10 under the control of the electromagnetic heating control device. The electromagnetic heating coil is a semispherical coil and is formed by surrounding a semispherical coil framework made of a heat-resistant material with a pure copper high-frequency heating coil. The electromagnetic heating coil winds around the outer wall of the lower part 102 of the wok 10 and heats the wok 10 under the control of the electromagnetic heating control device. Due to the electromagnetic heating, a three-dimensional surround hemisphere heating temperature field which heats quickly and has high thermal efficiency is formed in the wok 10. The formed heating temperature field has a similar effect as traditional blowing-type cook-stoves heating wok, it greatly meets the requirement of heating control in Chinese culinary art and is energy-efficient. In addition, the electromagnetic heating has no time lag, so that the method of electromagnetic heating is much more sensitive than the traditional modes of open fire or resistance power generation conduction and the like for adjusting the cooking heating degree.

The wok rotating device 12 includes a rotating shaft and a stir-frying motor, the rotating shaft is fixedly connected with the wok 10, the stir-frying motor is connected with the main control device 9 of the automatic cooking machine and drives the rotating shaft to rotate when receives rotating control commands sent by the main control device 9, thereby driving the wok 10 to rotate by 360 degrees. In particular, the stir-frying motor is fixed below the electromagnetic heating coil through a wok connecting device 15, one end of the rotating shaft is fixedly connected to the lower part 102 of the wok 10, the other end of the rotating shaft is connected with the stir-frying motor, and the rotating shaft coincides with the central axis of the wok 10 and rotates under the control of the stir-frying motor, so as to drive the wok 10 to achieve various rotation motions. The stir-frying function of the wok 10 in the present embodiment realizes various stir-frying effects in the way of rotation motions combination control, which is similar to a roller rotating and stirring.

Various effects like saute-stirring and stir-frying can be realized by combining various rotation modes including high-speed rotation, low-speed rotation, clockwise rotation and anti-clockwise rotation. By cooperatively using stirring pieces arranged in the wok 10 and controlling the rotating angle of the wok 10 (by a wok working position controlling device 13), the stir-frying effect like tossing the pan can be realized.

In an alternative embodiment, the wok device 1 further includes a protective shell 16; the wok 10, the wok heating device 11 and the wok rotating device 12 are arranged in the protective shell 16; two moving connecting pieces 142 of the wok moving control device 14 are respectively connected with two sides of the shell protective 16; the wok working position controlling device 13 is connected with the protective shell 16 through the moving connecting pieces 142 so as to control the wok 10 in the protective shell 16 to turn, and the wok working position controlling device 13 is driven by the wok moving control device 14 to drive the wok 10 in the protective shell 16 to move. The protective shell 16 can play a role in protecting the wok 10, the wok heating device 11 and the wok rotating device 12.

In an alternative embodiment, the wok working position controlling device 13 comprises working position rotating shafts 131 and a working position motor 132 used for driving the working position rotating shaft 131 to rotate; the working position rotating shafts 131 are respectively connected to two opposite sides of the protective shell 16, and one of the working position rotating shafts 131 is connected with the working position motor 132; the working position motor 132 is mounted on one of the moving connecting pieces, and the other of the working position rotating shafts 131 is connected with the other one of moving connecting pieces. Therefore, the working position motor 132 can drive the protective shell 16 to turn through the working position rotating shafts 131 to drive the wok 10 to turn, and the orientation of the wok opening of the wok 10 is changed, so that the wok 10 can work at different working positions.

In the embodiment of the present invention, the wok moving control device 14 includes two sets of moving control assemblies 140; each set of the moving control assemblies 140 includes an telescopic rod 141, a moving connecting piece 142 and a wok moving linear motor 143 fixed in the cooking machine; the two moving connecting pieces 142 are respectively arranged on both sides of the wok 10, in particular on both sides of the protective shell 16; one end of the telescopic rod 141 is connected with a driving terminal of the corresponding wok moving linear motor 143 in the same set of the moving control assemblies 140, and the other end of the telescopic rod 141 is connected with the corresponding moving connecting piece 142; and the two telescopic rods 141 are arranged in parallel.

That is, the two opposite sides of the wok 10 are each provided with one of the moving control assemblies 140 used for carrying out the same-direction linear motion. The two sets of the moving control assemblies 140 have the advantages of better bearing the weight of the wok 10, preventing the wok 10 from inclining to one side and improving the structural stability. Under the driving of the wok moving linear motors 143, the telescopic rods 141 move telescopically in a straight line to drive the wok working position controlling device 13, the wok 10 and other devices connected with the wok 10 to move.

Preferably, each set of the moving control assemblies 140 further includes a moving guide rail 144 fixed inside the cooking machine. The moving guide rails 144 in the two sets of moving control assemblies 140 are parallel to each other; the telescopic rod 141 and the moving connecting piece 142 in the same set of the moving control assemblies 140 are disposed on the corresponding movable guide rail 144, so that the wok moving linear motors 143 drive the wok 10 to move directionally in a direction parallel to the moving guide rails 144. The moving guide rails 144 can assist the movement of the telescopic rods 141 and prevent the telescopic rods 141 from being affected by external force such as gravity, thereby ensuring that the wok 10 moves in a straight line.

More preferably, the wok moving control device 14 further includes an upper sensor and a lower sensor which are arranged on one of the moving connecting pieces 140' and used for sensing whether the position of the wok 10 driven up and down reaches the position demanded by the system or not. The upper sensor is used for controlling the driving motors to stop rotating by the system after sensing that the wok 10 reaches a wok lid closing position when moving upwards, so that the wok 10 is positioned at the position to perform a cooking operation; and the lower sensor is used for controlling the driving motors to stop rotating by the system after sensing that the wok 10 moves downwards to reach a wok lid opening position, so that the wok 10 is positioned at the position to perform working position changing operation.

Figure 4:
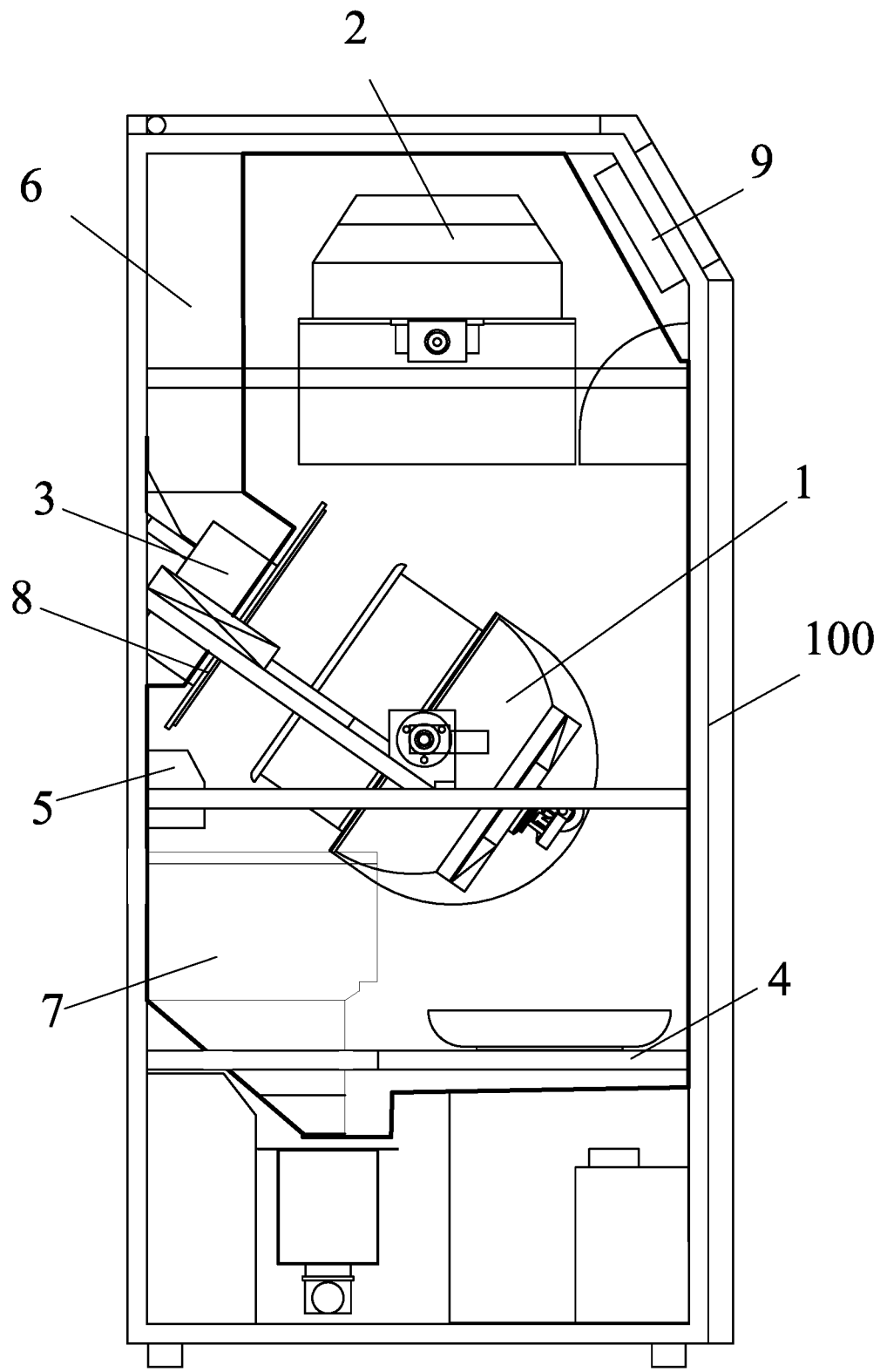
FIG. 4 is a schematic view illustrating a first state of the wok device 1 for full-automatic cooking machines at a cooking working position in an embodiment of the present invention.
Figure 5:
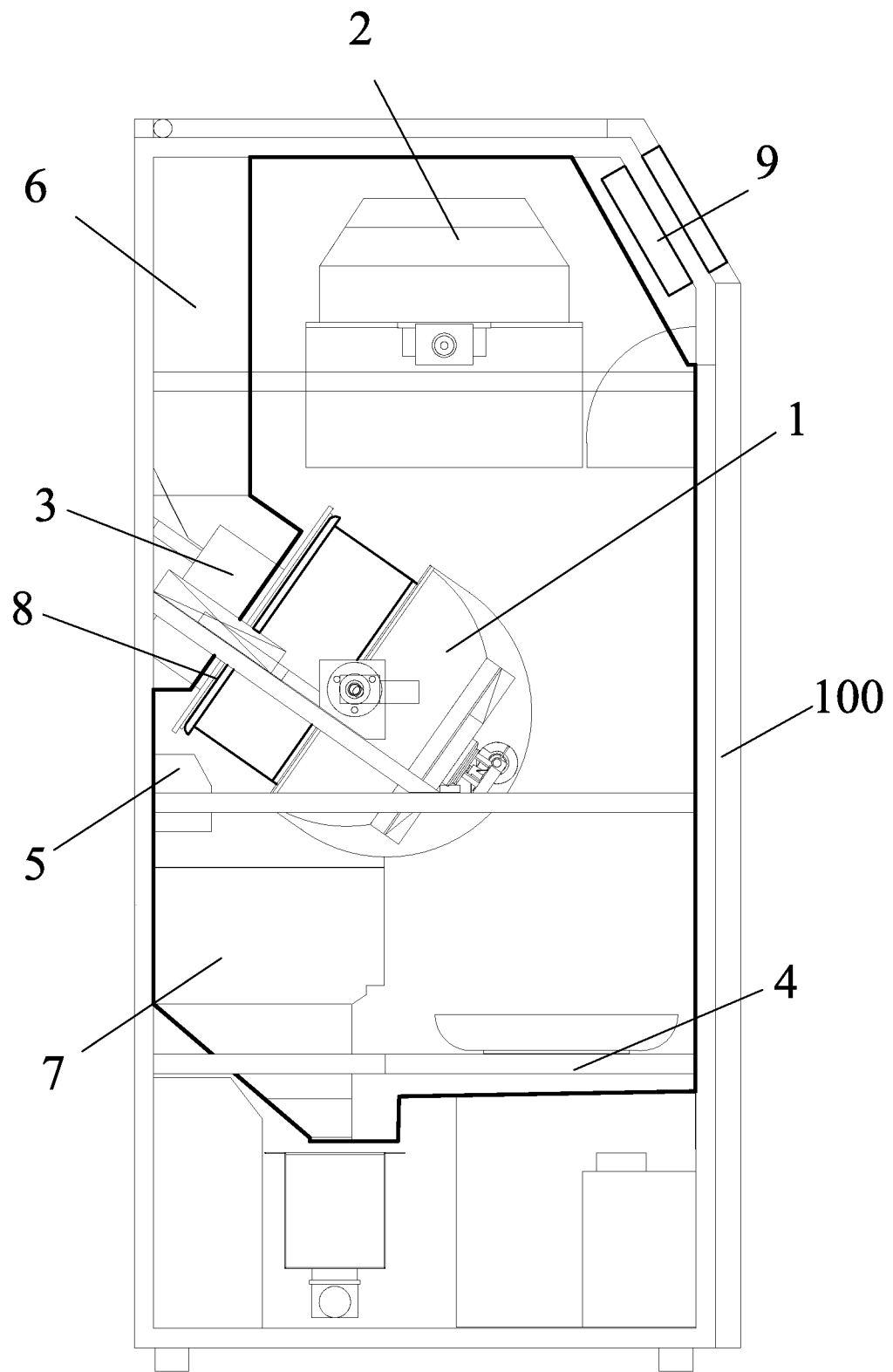
FIG. 5 is a schematic view illustrating a second state of the wok device 1 for full-automatic cooking machines at a cooking working position in an embodiment of the present invention.

In the embodiment, five working positions are provided according to different mounting positions of operating devices of the full-automatic cooking machine, i.e. an ingredient feeding working position, an seasoning adding (cooking) working position, a dish discharging working position, a wok washing working position and a waste water draining working position, and when the wok working position controlling device 13 drives the wok 10 to turn to each working position, and makes the opening of the wok 10 face towards each corresponding device so as to perform corresponding automatic cooking operations such as ingredient feeding, cooking (seasoning adding), dish discharging, wok washing, waste water draining, etc. For example, when the wok working position controlling device 13 receives a major ingredient feeding control command, the wok 10 is turned to an ingredient feeding working position (which is vertical position, namely, the original position), so as to make the opening of the wok 10 face towards the automatic ingredient feeding device 2;

when the wok working position controlling device 13 receives an seasoning adding command or a rotating control command, the wok 10 is turned to an seasoning adding (cooking) working position (which is preferably a position with a 45-degree angle to the original position) in a clockwise direction, so as to make the opening of the wok 10 face towards a wok lid 8, and the working state of the wok device 1 is shown in FIG. 4 at the moment; then the wok moving control device 14 receives a wok lid closing control command and controls the wok 10 to move towards the wok lid 8, so that the opening of the wok 10 is covered with the wok cover 8, and the working state of the wok device 1 is shown in the FIG. 5 at the moment; and then, the wok rotating device 12 controls the wok 10 to rotate to perform cooking operation;

when the wok working position controlling device 13 receives a dish discharging control command, the wok 10 is turned to a dish discharging working position (which is preferably a position with a 135-degree angle to the original position) in a clockwise direction, so as to make the opening of the wok 10 face towards the automatic dish discharging device 4;

when the wok working position controlling device 13 receives a wok washing control command, the wok 10 is turned to a wok washing working position (which is preferably a position with a 45-degree angle to the original position) in an anti-clockwise direction, so as to make the opening of the wok 10 face towards the automatic wok washing device 5 and when receiving a waste water draining control command after the wok washing is finished, the wok is further turn to a waste water draining working position (preferably, the inclination angle between the wok 10 and the initial state is 225-235 degrees) in an anti-clockwise direction, so as to make the opening of the wok 10 face towards the flow guiding device 7.

Therefore, the wok device for full-automatic cooking machines provided by the embodiment of the invention not only can control the wok 10 to rotate through the wok rotating device 12 for stir-frying, and control the wok 10 to turn through the wok working position controlling device 13 so as to enable the wok 10 to reach a corresponding working position for corresponding operation, but also can control the wok 10 to move through the wok moving control device 14 so as to enable the wok 10 to be better matched with other devices of the cooking machine, for example, the wok can be matched with the wok lid 8, and the wok can be turned to the cooking working position and moved to keep a tightly closed state with the wok lid 8 during cooking, so that the automation of the cooking machine is further improved, and the working efficiency of the cooking machine is improved.

It should be noted that, in the wok device for full-automatic cooking machines provided by the embodiment of the invention, the wok moving control device 14 controls the wok 10 to move so as to be matched with the wok lid 8 to perform a cooking operation, but this is only one implementation manner, and the wok moving control device 14 may also control the wok 10 to move so as to be matched with other device, such as the automatic ingredient feeding device 2 or the automatic dish discharging device 4, to perform other operation.

Meanwhile, the wok device for full-automatic cooking machines provided by the embodiment of the invention further includes a wok lid 8 which is fixed inside the cooking machine and matched with the opening of the wok 10.

Figure 6:
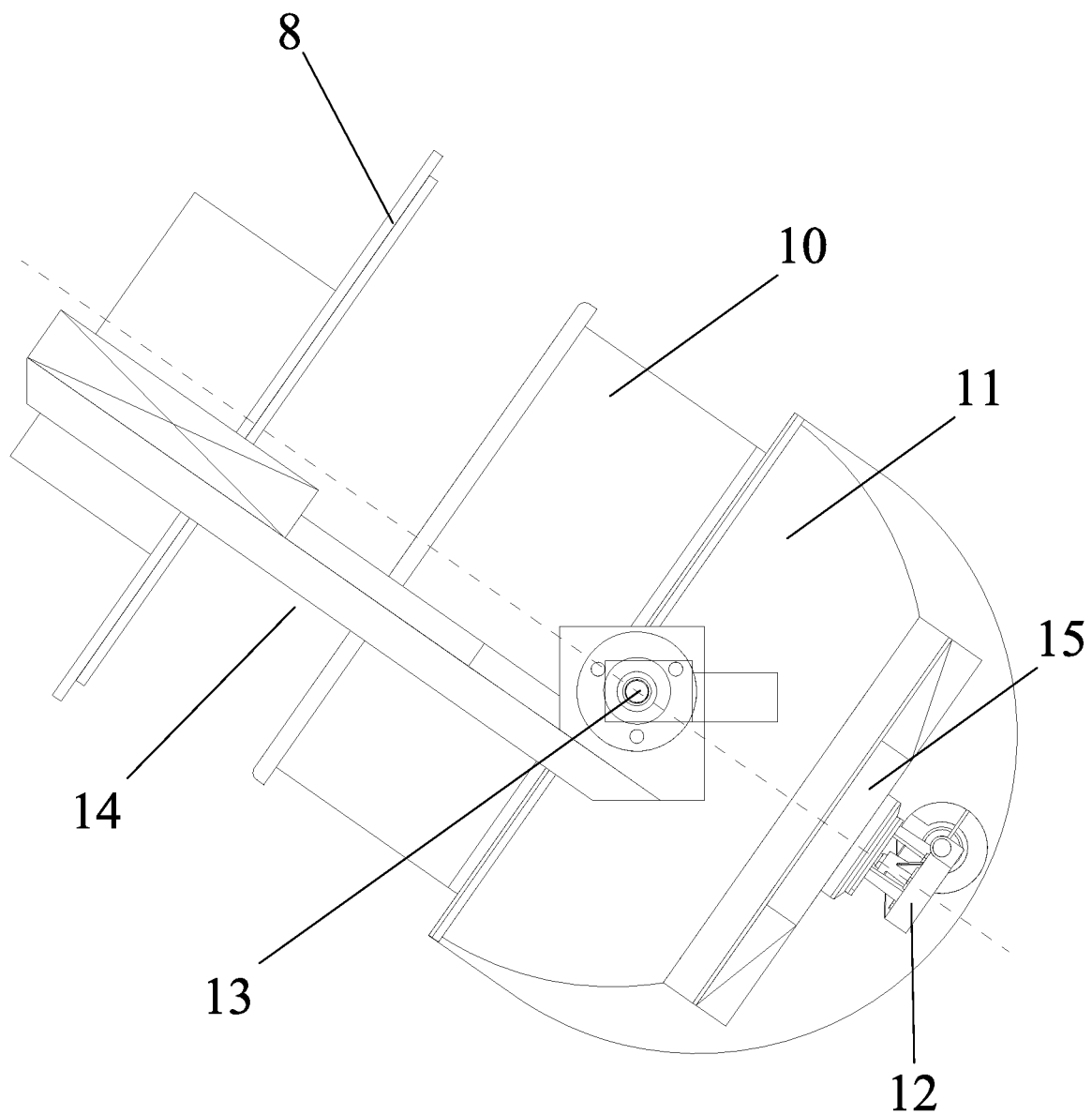
FIG. 6 is a schematic view illustrating an open state of a wok 10 of the wok device for full-automatic cooking machines in an embodiment of the present invention.
Figure 7:
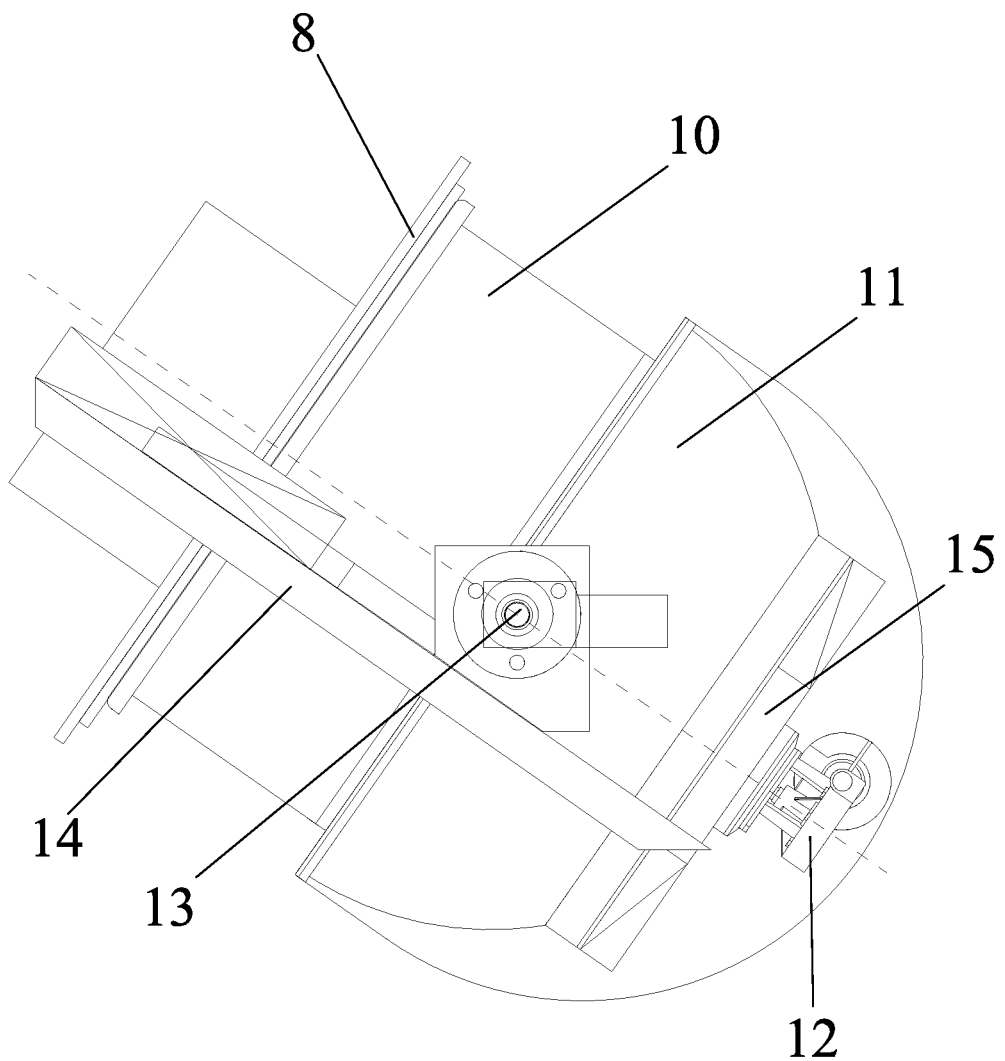
FIG. 7 is a schematic view illustrating a closed state of a wok 10 of the wok device for full-automatic cooking machines in an embodiment of the present invention.

Referring to FIGS. 6 and 7, FIG. 6 is a schematic view illustrating an open state of a wok 10 of the wok device for full-automatic cooking machines in an embodiment of the present invention, and FIG. 7 is a schematic view illustrating a closed state of a wok 10 of the wok device for full-automatic cooking machines in an embodiment of the present invention.

The moving direction of the wok 10 is parallel to the central axis of the wok lid 8; when the wok 10 is turned to the cooking working position, the opening of the wok 10 faces the wok lid 8 and the central axis of the wok 10 coincides with the central axis of the wok lid 8. Therefore, when a cooking operation is to be performed, firstly, the wok 10 is turned to the cooking working position through the wok working position controlling device 13, so that the opening of the wok 10 is right opposite to the wok lid 8, and the state is shown in the FIG. 4; then, the wok 10 is moved through the wok moving control device 14, so that the opening of the wok 10 is closed by the wok lid 8; and then, the wok 10 is controlled by the wok rotating device 12 to rotate for cooking; after the cooking operation is finished, the wok 10 is to be opened, and the wok 10 is moved through the wok moving control device 14 to separate from the wok lid 8.

Figure 8:
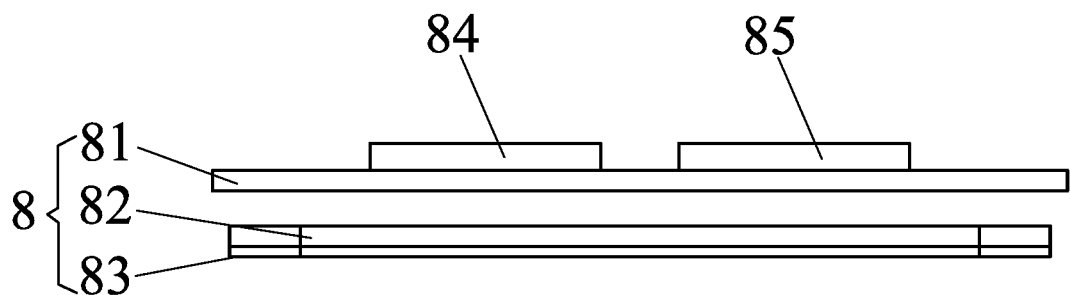
FIG. 8 is a front view of the wok lid 8 in FIGS. 6 and 7.

Referring to FIG. 8, FIG. 8 is a front view of the wok lid 8 in FIGS. 6 and 7. The wok lid 8 includes a wok lid plate 81 and a wok lid sealing container; the wok lid sealing container includes a fixing part 82 installed on the wok lid plate 81 and a sealing strip 83 which can be arranged on the periphery of the fixing part 82 in a relatively rotating and sleeving mode. An area enclosed by the sealing strip 83 is matched with the opening of the wok 10 in size and shape. Therefore, when the wok lid 8 seals the opening of the wok 10 through the sealing strip 83 and the wok 10 rotates, the sealing strip 83 rotates along with the wok 10, so that the resistance of the wok 10 as it rotates is reduced.

Figure 9:
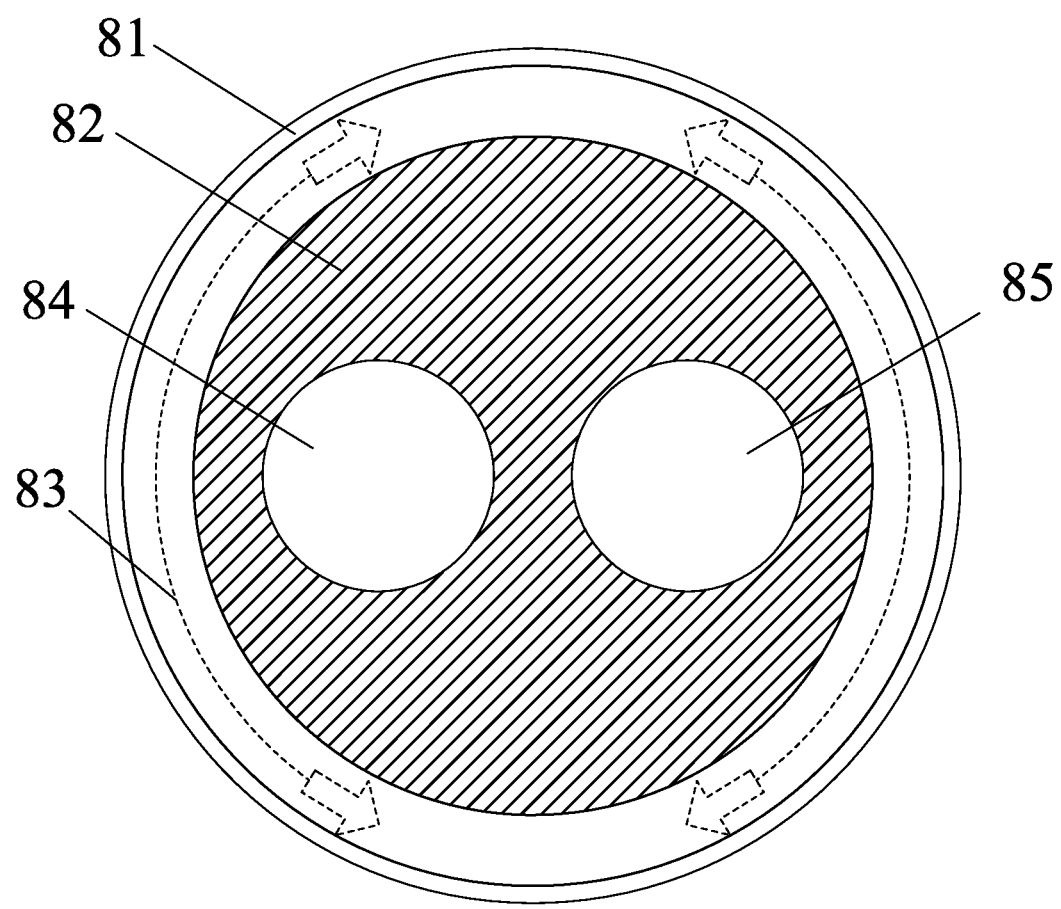
FIG. 9 is a top view of the wok lid 8 in FIGS. 6 and 7.

Preferably, the wok lid plate 81 is provided with a cooking fume channel opening 84 communicated with the cooking fume treatment device 6 of the cooking machine; the fixing part 82 is provided with a first communication opening communicated with the cooking fume channel opening 84; the wok lid plate 81 is provided with an seasoning adding opening 85 communicated with the automatic seasoning adding device 3 of the cooking machine; and the fixing part 82 is provided with a second communication opening communicated with the seasoning adding opening 85, as shown in FIG. 9 which is a top view of the wok lid 8 in FIGS. 6 and 7.

As a modified embodiment, the wok lid plate 81 is provided with a common channel opening; the common channel opening is communicated with the cooking fume treatment device 6 and the automatic seasoning adding device 3 of the cooking machine; and a common communication opening communicated with the common channel opening is formed in the fixing part 82. That is, the cooking fume channel opening 84 and the seasoning adding opening 85 are achieved through the common channel opening at the same time, and seasoning adding or cooking fume extracting can be performed through the common channel opening.

Preferably, the fixing part 82 is detachably installed on the wok lid plate 81.

The Second Embodiment

Compared with the first embodiment, the second embodiment has a main difference that the structure of the wok devices are different due to the fact that the structures of the wok moving control devices are different, only the correspondingly connection parts of the wok device and of the wok moving control device are described hereinafter in an image-text mode, and the rest parts of the wok device can all adopt the means of the first embodiment, which are not described in detail in the second embodiment.

Figure 11:
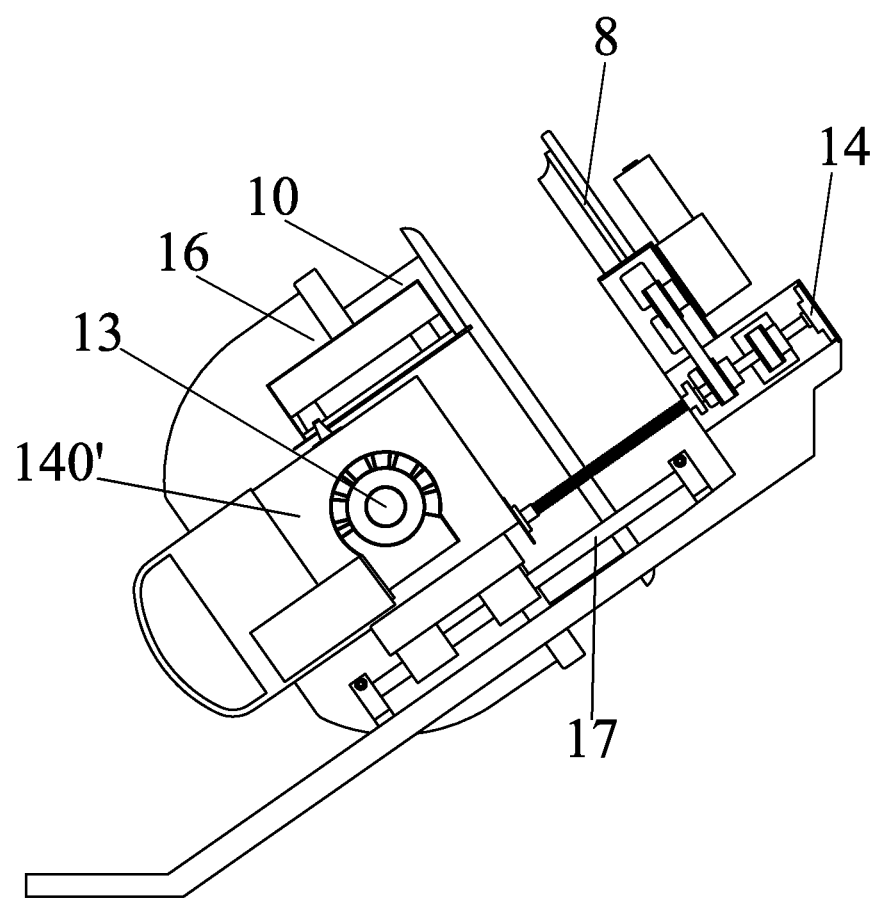
FIG. 11 is a schematic structure view of a wok device for full-automatic cooking machines in the second embodiment of the present invention.
Figure 12:
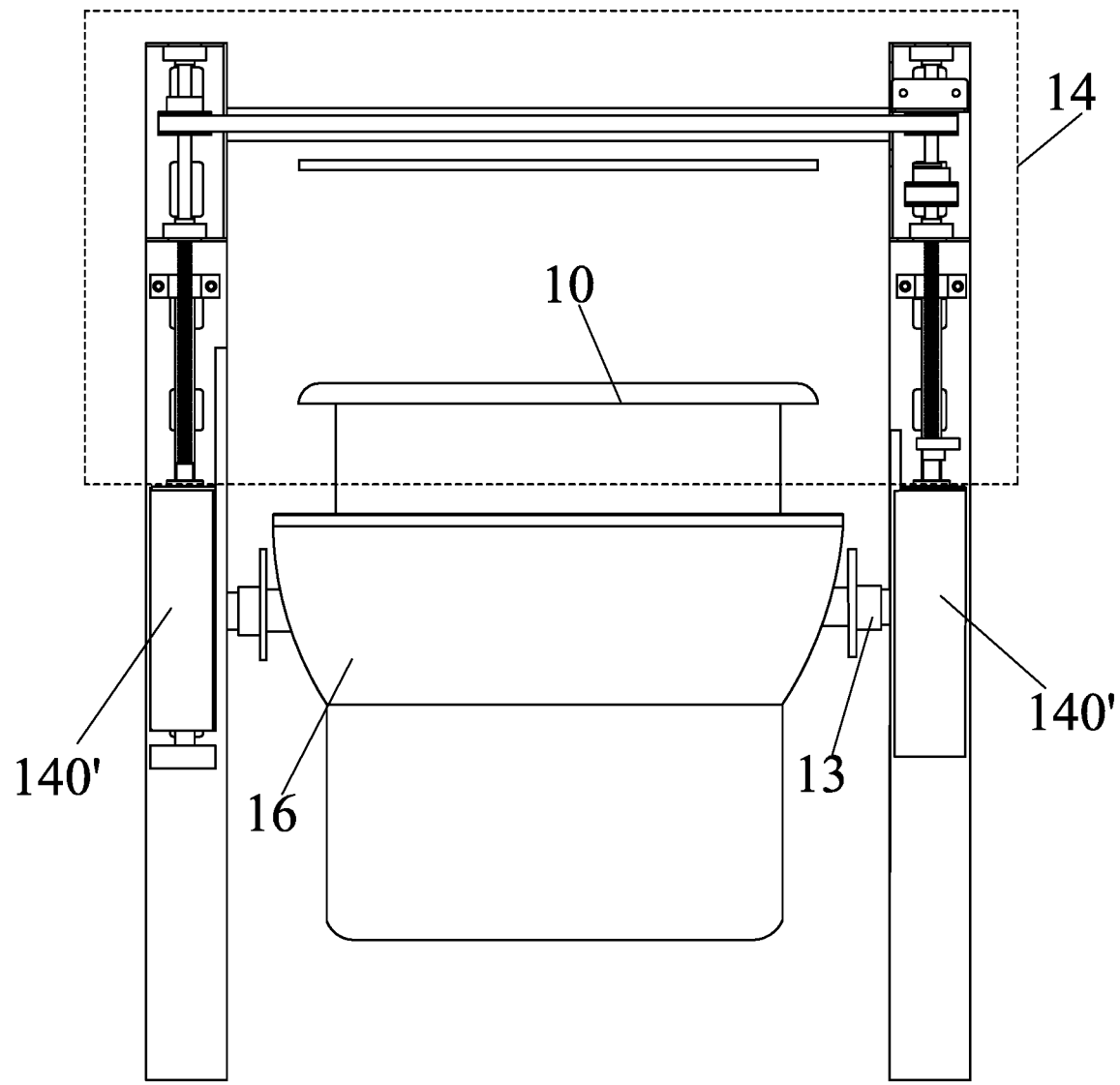
FIG. 12 is a side view of FIG. 11.
Figure 13:
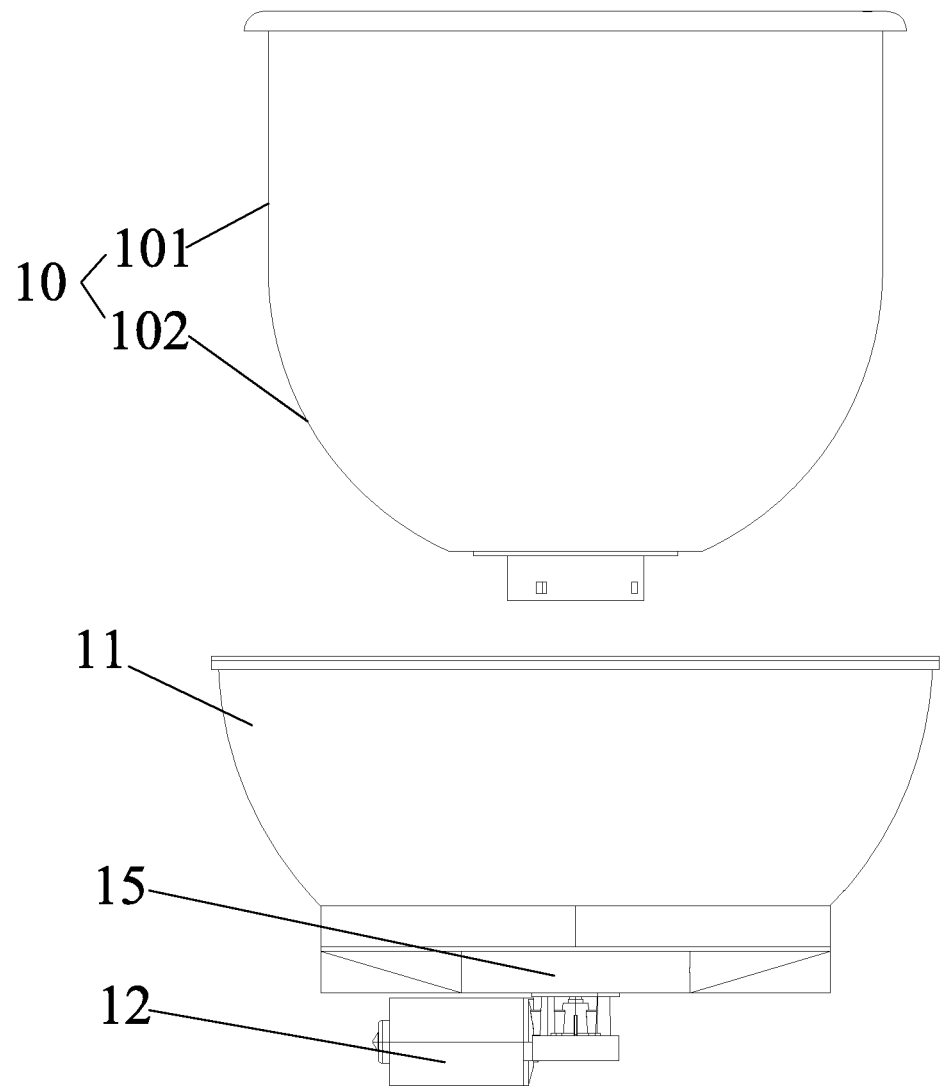
FIG. 13 is a schematic view of a partial structure of the wok device 1 in FIG. 11.

In the following, the structure of the wok device for full-automatic cooking machines according to the second embodiment of the present invention is described in detail with reference to FIGS. 11-13. FIG. 11 is a schematic structure view of a wok device for full-automatic cooking machines in the second embodiment of the present invention, FIG. 12 is a side view of FIG. 11, and FIG. 13 is a schematic view of a partial structure of the wok device 1 in FIG. 11. The wok device 1 for full-automatic cooking machines includes a wok 10, a wok heating device 11, a wok rotating device 12, a wok working position controlling device 13 and a wok moving control device 14;

the wok heating device 11 is adapted for heating the wok 10;

the wok rotating device 12 is connected with the wok 10 and adapted for controlling the wok 10 to rotate around the central axis of the wok 10;

the wok working position controlling device 13 is adapted for fixing the wok 10 to the wok moving control device 14 and controlling the wok 10 to turn to reach a corresponding working position for corresponding operation;

the wok moving control device 14 is adapted for controlling the wok working position controlling device 13 to move directionally in the cooking machine so as to drive the wok 10 to move directionally in the cooking machine;

the wok heating device 11, the wok rotating device 12, the wok working position controlling device 13 and the wok moving control device 14 are connected with a main control device 9 of the cooking machine so as to receive a control command sent by the main control device 9 according to a preset recipe program, and respectively perform heating, rotating, turning and moving operations on the wok 10 according to the control command.

Figure 14:
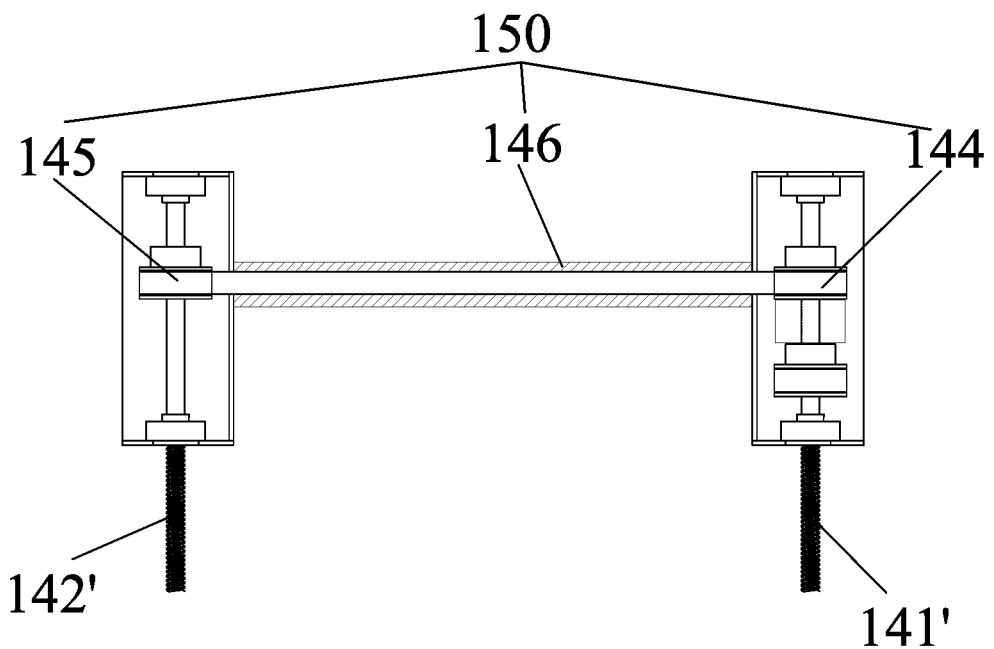
FIG. 14 is a schematic structural view of a wok moving control device 14 of the wok device 1 in FIG. 11.
Figure 15:
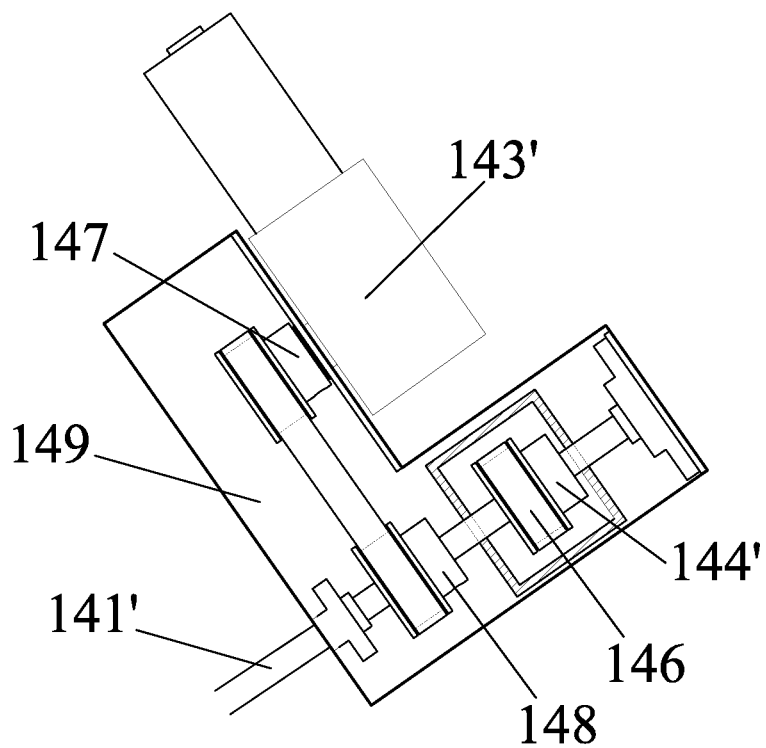
FIG. 15 is a side view of FIG. 14.

Referring to FIGS. 14 and 15, FIG. 14 is a structural schematic view of the wok moving control device 14 of the wok device 1 in FIG. 11, and FIG. 15 is a side view of FIG. 14.

The wok moving control device 14 includes a main driving screw rod 141', an auxiliary driving screw rod 142', a driving motor 143', a synchronous rotating assembly 150 and two moving connecting pieces 140'. The two moving connecting pieces 140' are used for being connected with the two sides of the wok 10 respectively; in particular to both sides of the protective shell 16 respectively; the first end of the main driving screw rod 141' is connected with one of the moving connecting pieces 140', and the first end of the auxiliary driving screw rod 142' is connected with the other one of the moving connecting pieces 140'; the second end of the main driving screw rod 141' is connected with the second end of the auxiliary driving screw rod 142' through the synchronous rotating assembly 150; the driving motor 143' is used for driving the main driving screw rod 141' to rotate; the main driving screw rod 141' and the auxiliary driving screw rod 142' are maintained in parallel.

The operating principle of the wok moving control device in the embodiment of the invention is as follows: the driving motor 143' drives the main driving screw rod 141' to rotate, and drives the auxiliary driving screw rod 142' to rotate through the synchronous rotating assembly 150, that is, the driving motor 143' rotates to drive the main driving screw rod 141' and the auxiliary driving screw rod 142' to rotate at the same time; the main driving screw rod 141' and the auxiliary driving screw rod 142' respectively convert rotation into linear motion to drive the left side and the right side of the wok 10 to move front and back synchronously. The embodiment of the present invention adopts double-side synchronous driving, avoids the distortion of the wok device caused by single-side driving, and only needs one driving motor 143', thereby having simple structure and reducing cost.

Preferably, the synchronous rotating assembly 150 includes a first synchronous wheel 144', a second synchronous wheel 145 and a first synchronous belt 146; the first synchronous wheel 144' is arranged on the main driving screw rod 141'; the second synchronous wheel 145 is arranged on the auxiliary driving screw rod 142'; the first synchronous belt 146 is connected with the first synchronous wheel 144' and the second synchronous wheel 145, so that the first synchronous wheel 144' drives the second synchronous wheel 145 to rotate when rotating. The rotation of the first synchronous wheel 144' is transmitted to the second synchronous wheel 145 through the first synchronous belt 146, so that the main driving screw rod 141' drives the auxiliary driving screw rod 142' to rotate.

Preferably, the synchronous rotating assembly 150 further includes a third synchronous wheel 147, a fourth synchronous wheel 148 and a second synchronous belt 149; a driving terminal of the driving motor 143' is connected with the third synchronous wheel 147; the fourth synchronous wheel 148 is arranged on the main driving screw rod 141'; the second synchronous belt 149 is connected with the third synchronous wheel 147 and the fourth synchronous wheel 148, so that the third synchronous wheel 147 drives the fourth synchronous wheel 148 to rotate when rotating. According to the embodiment of the invention, the main driving screw rod 141' is indirectly driven through the third synchronous wheel 147, the fourth synchronous wheel 148 and the second synchronous belt 149 instead of directly driving the main driving screw rod 141' by adopting the driving motor 143', so that the driving motor 143' can be well protected, and the service life of the driving motor 143' is prolonged.

Preferably, the wok moving control device further includes two linear sliding rails 17 which are fixed in the cooking machine and are parallel to each other; the two moving connecting pieces 140' are movably arranged on the two linear sliding rails 17 in a one-to-one correspondence mode. Specifically, sliding blocks are arranged on the two moving connecting pieces 140' respectively, and sliding grooves matched with the corresponding linear sliding rails 17 are respectively formed in the sliding blocks.

Preferably, the two linear sliding rails 17 are installed on a supporting beam fixed to the interior of the automatic cooking machine, and therefore the whole wok device is better supported.

Preferably, the wok moving control device 14 further includes a limit switch box arranged above one of the moving connecting pieces 140', and the limit switch box includes a first limit switch arranged at the upper limit position of the wok and a second limit switch arranged at the lower limit position of the wok. Whether the wok reaches two limit positions in the linear motion direction or not can be detected through the first limit switch and the second limit switch, and when the wok reaches the two limit positions, the driving motor 143' is stopped, so that the moving mechanism is prevented from being damaged.

More preferably, the wok moving control device 14 further includes an upper sensor and a lower sensor which are arranged on one of the moving connecting pieces 140' and used for sensing whether the up-and-down driving position of the furnace body reaches the position required by the system or not. The upper sensor is used for controlling the driving motor to stop rotating by the system after sensing that the wok 10 reaches a wok lid closing position when moving upwards, so that the wok 10 is positioned at the position to perform a cooking operation; the lower sensor is used for controlling the driving motor to stop rotating by the system after sensing that the wok 10 moves downwards to reach a wok lid opening position, so that the wok 10 is positioned at the position to perform a working position changing operation.

Compared with the first embodiment, the difference between the second embodiment and the first embodiment lies in that the first embodiment adopts a double-motor double-side linear driving for driving wok to move linearly, the second embodiment adopts a single-motor double-side synchronous driving for driving wok to move linearly, and the second embodiment has better synchronism, simple structure and lower cost.

Compared with the prior art, the wok device for full-automatic cooking machines provided by the embodiments of the present invention has the beneficial effects that: the wok device for full-automatic cooking machines includes a wok, a wok heating device, a wok rotating device, a wok working position controlling device and a wok moving control device; the wok heating device is adapted for heating the wok; the wok rotating device is connected with the wok and adapted for controlling the wok to rotate around the central axis of the wok; the wok working position controlling device is adapted for fixing the wok on the wok moving control device and controlling the wok to turn so as to enable the wok to reach a corresponding working position for corresponding operation; and the wok moving control device is adapted for controlling the wok working position controlling device to move directionally in the cooking machine so as to drive the wok to move directionally in the cooking machine. By means of the wok moving control device, the wok device can control the wok to move on the basis of original ability to turn for changing working positions, so that the wok can be matched with other device such as a wok lid, the automation of the automatic cooking machine is further improved, and the working efficiency of the automatic cooking machine is improved.

The foregoing descriptions are merely exemplary embodiments of the present invention, but are not intended to limit the present disclosure. Any modifications, equivalent substitutions, and improvements made by those skilled in the art within the spirit and principle of the present disclosure shall fall within the protection scope of the present disclosure.

What is claimed is:

1. A wok device for full-automatic cooking machines, comprising a wok, a wok heating device, a wok rotating device, a wok working position controlling device and a wok moving control device;

the wok heating device is adapted for heating the wok; the wok rotating device is connected with the wok and adapted for controlling the wok to rotate around a central axis of the wok;

the wok working position controlling device is adapted for fixing the wok on the wok moving control device and controlling the wok to turn to reach a corresponding working position for corresponding operation;

the wok moving control device is adapted for controlling the wok working position controlling device to move directionally in the cooking machine so as to drive the wok to move directionally in the cooking machine;

the wok heating device, the wok rotating device, the wok working position controlling device and the wok moving control device are connected with a main control device of the cooking machine so as to receive a control command sent by the main control device according to a preset recipe program, and respectively perform heating, rotating, turning and moving operations on the wok according to the control command;

the wok device further comprises a protective shell; the wok, the wok heating device and the wok rotating device are arranged in the protective shell;

the wok working position controlling device is connected with the protective shell to control the wok in the protective shell by turning it, and the wok working position controlling device is driven by the wok moving control device to drive the wok in the protective shell to move;

the wok moving control device comprises a main driving screw rod, an auxiliary driving screw rod, a driving motor, a synchronous rotating assembly and two moving connecting pieces;

the two moving connecting pieces are adapted for being connected with both sides of the protective shell respectively;

a first end of the main driving screw rod is connected with one of the two moving connecting pieces, and a first end of the auxiliary driving screw rod is connected with an other one of the two moving connecting pieces;

a second end of the main driving screw rod is connected with a second end of the auxiliary driving screw rod through the synchronous rotating assembly;

the driving motor is adapted for driving the main driving screw rod to rotate; the main driving screw rod and the auxiliary driving screw rod are maintained parallel to each other;

wherein the synchronous rotating assembly comprises a first synchronous wheel, a second synchronous wheel and a first synchronous belt;

the first synchronous wheel is arranged on the main driving screw rod;

the second synchronous wheel is arranged on the auxiliary driving screw rod;

the first synchronous belt is connected with the first synchronous wheel and the second synchronous wheel, so that the first synchronous wheel drives the second synchronous wheel to rotate when rotating.

2. The wok device for full-automatic cooking machines according to claim 1, wherein the synchronous rotating assembly further comprises a third synchronous wheel, a fourth synchronous wheel and a second synchronous belt;

a driving terminal of the driving motor is connected with the third synchronous wheel;

the fourth synchronous wheel is arranged on the main driving screw rod;

the second synchronous belt is connected with the third synchronous wheel and the fourth synchronous wheel, so that the third synchronous wheel drives the fourth synchronous wheel to rotate when rotating.

3. The wok device for full-automatic cooking machines according to claim 2, wherein the wok moving control device further comprises two linear sliding rails which are fixed in the cooking machine and are parallel to each other;

the two moving connecting pieces are movably arranged on the two linear sliding rails respectively.

4. The wok device for full-automatic cooking machines according to claim 1, wherein the wok working position controlling device comprises working position rotating shafts and a working position motor adapted for driving the working position rotating shafts to rotate;

the working position rotating shafts are respectively connected to two opposite sides of the protective shell, and one of the working position rotating shafts is connected with the working position motor;

the working position motor is mounted on one of the two moving connecting pieces, and the other one of the working position rotating shafts is connected with the other one of the two moving connecting pieces.

5. The wok device for full-automatic cooking machines according to claim 1, wherein the wok moving control device further comprises a limit switch box arranged above one of the two moving connecting pieces;

the limit switch box comprises a first limit switch arranged at an upper limit position of the wok and a second limit switch arranged at a lower limit position of the wok.

6. The wok device for full-automatic cooking machines according to claim 1, further comprising a wok lid fixed in the cooking machine and matched with a wok opening of the wok;
   wherein the wok moving control device drives the wok to move up or down, so that the wok opening of the wok is closed or opened by the wok lid.

7. The wok device for full-automatic cooking machines according to claim 6, wherein when the wok is turned to a cooking working position, the wok opening of the wok faces the wok lid, the central axis of the wok coincides with a central axis of the wok lid, and the moving direction of the wok is parallel to the central axis of the wok lid.

8. The wok device for full-automatic cooking machines according to claim 7, wherein when a cooking operation is to be performed, firstly, the wok working position controlling device controls the wok to turn to the cooking working position, so that the wok opening is opposite to the wok lid, then the wok moving control device controls the wok to move, so that the wok opening is closed by the wok lid, and then the wok rotating device controls the wok to rotate so as to perform the cooking operation;

after the cooking operation is finished, the wok moving control device controls the wok to move reversely, so that the wok opening is separated from the wok lid to open the wok.

9. A full-automatic cooking machine, comprising a housing and the wok device for full-automatic cooking machines according to claim 1, wherein the wok device is arranged in the housing.

10. The full-automatic cooking machine according to claim 9, wherein the wok device further comprises a wok lid fixed in the housing and matched with a wok opening of the wok; the wok moving control device drive the wok to move up or down, so that the wok opening is closed or opened by the wok lid;
   when the wok is turned to a cooking working position, the wok opening faces the wok lid, the central axis of the wok coincides with a central axis of the wok lid, and the moving direction of the wok controlled by the wok moving control device to move in the housing is parallel to the central axis of the wok lid.

\* \* \* \* \*